June 30, 1970     T. L. ROHDE     3,518,411
INFRARED HEATING APPARATUS FOR SEALING REED SWITCHES
Filed Jan. 17, 1968
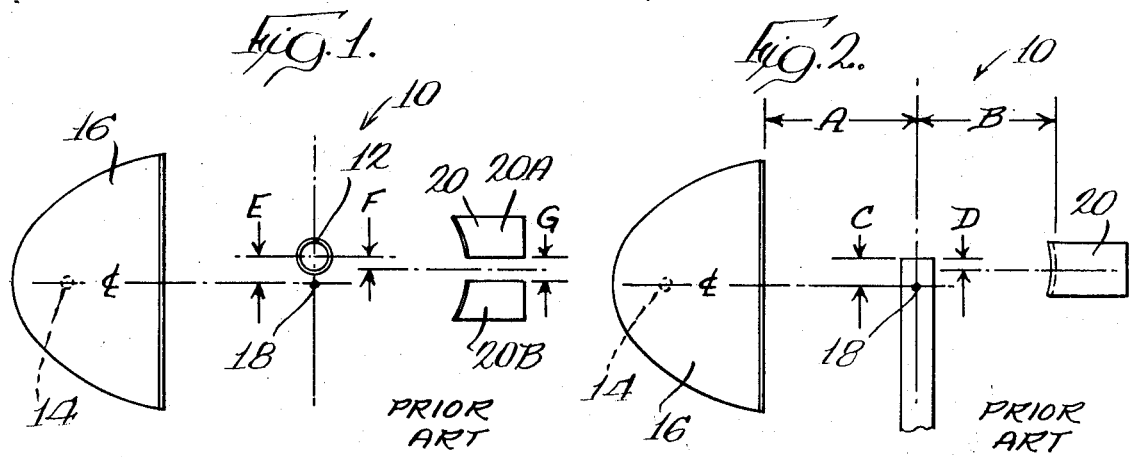
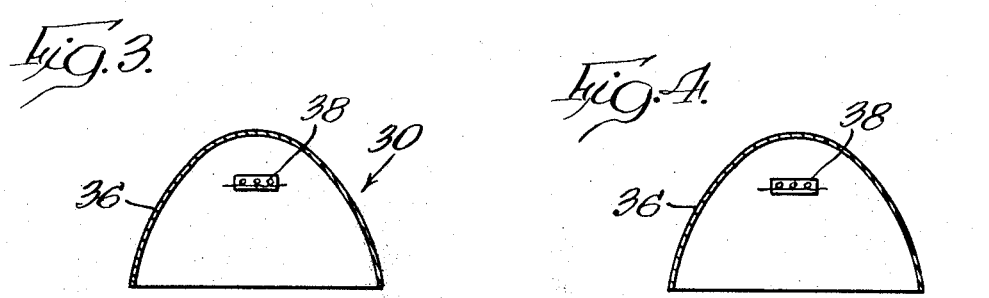
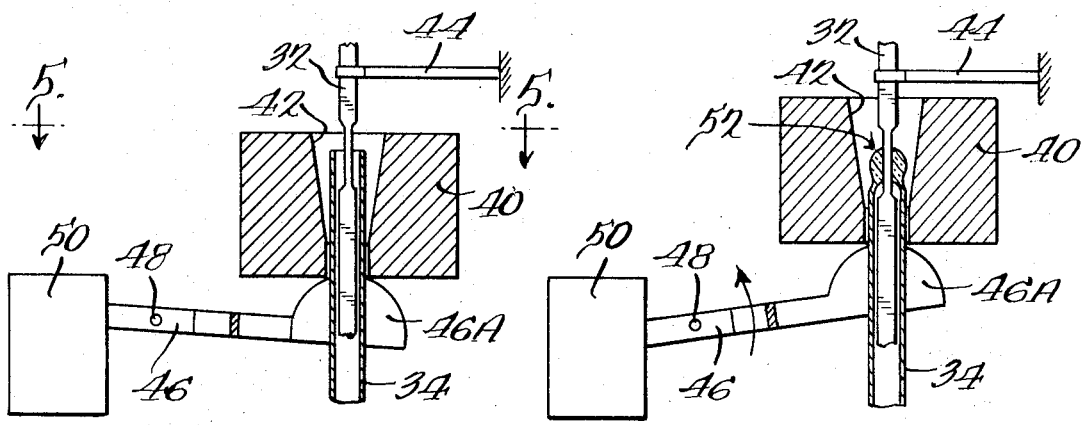
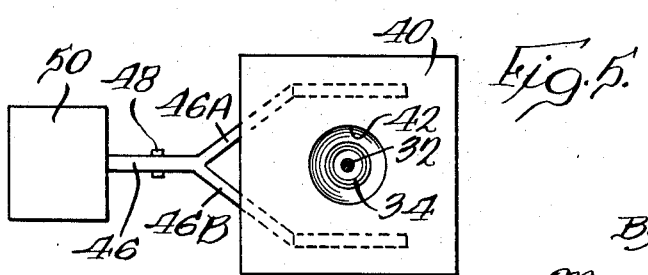
Inventor:
Terry L. Rohde
By Mason, Kolehmainen, Rathburn & Wyss
Attys United States Patent Office 3,518,411
Patented June 30, 1970

3,518,411
INFRARED HEATING APPARATUS FOR
SEALING REED SWITCHES
Terry L. Rohde, Chicago, Ill., assignor to C. P. Clare &
Company, Chicago, Ill., a corporation of Delaware
Filed Jan. 17, 1968, Ser. No. 698,471
Int. Cl. H05b 1/00, 3/00
U.S. Cl. 219—349                    6 Claims

ABSTRACT OF THE DISCLOSURE

An apparatus for and a method of sealing a magnetic reed in the open end of a tube of infrared absorbing glass includes an eliptical reflector with an infrared energy source at one focal point. The open end of the tube is disposed at the second focal point of the elliptical reflector with the axis of the tube extending along an extension of the line conecting the two focal points. The end of the tube to be sealed is also received within a conical reflector with the tube axis aligned with the axis of the cone of reflection. The conical reflector is moved along the axis of the tube as the glass softens to form the seal so as to concentrate the infrared energy on the top of the seal.

This invention relates to a method of and apparatus for carrying out infrared heating and, more particularly, to a method of and apparatus for using infrared heat to make sealed magnetic reed switches.

The development of low cost, high energy infrared sources coupled with the availability of glass having very high energy absorption in the infrared range has made it possible to make sealed magnetic reed switches in less time than required in the past. The glass tube used to form the switch housing is made of infrared absorbing or "green" glass and, following the insertion of the magnetic reed into an open end of the housing, the glass tube is subjected to radiation in the infrared range to soften or melt the glass and seal the reed in the end of the tube.

In order to produce the seal as quickly as possible and to utilize the generated infrared energy as efficiently as possible, it has been proposed to place the energy source at one focal point of an elliptical reflector, to place the glass to be heated at a second focal point, and to use a spheroidal back reflector spaced from the glass tube and the elliptical reflector. This arrangement focuses the generated infrared energy on the glass to be heated in proximity to the point at which the glass-to-metal seal is to be formed. However, it is desirable to manufacture the reed switches using automatic machinery and continuous assembling techniques, and the focusing arrangement described above requires control of a rather large number of somewhat critical dimensions. Frequently, this control cannot be adequately exercised in an assembling machine. In addition, this arrangement has sometimes resulted in a "blowout" or the distortion of the last glass seal to be formed due to heat-induced expansion of the atmosphere sealed within the housing of switch.

Accordingly, one object of the present invention is to provide a new and improved method of and apparatus for carrying out infrared heating.

Another object is to provide an infrared heating apparatus using focused energy in which the number of critical dimensions is substantially reduced.

A further object is to provide a new and improved apparatus for making sealed reed switches in which the axis of the glass tube forming the housing of the switch is disposed along the axis of an elliptical reflector.

A further object is to provide a new and improved method of using infrared heat to form glass-to-metal seals in reed switches that avoids or reduces the number of "blowouts" previously encountered in switch production.

A further object is to provide a method of using infrared heat to form sealed reed switches that is adapted for use in continuous assembling operations.

In accordance with these and many other objects, an embodiment of the invention comprises an infrared heating apparatus for use in the forming of the glass-to-metal seals in reed switches which includes a high energy infrared source placed at the first focal point of an elliptical reflector to focus the infrared energy at a second focal point at which is disposed the open end of a glass tube in which a magnetic reed is positioned. The glass tube, which is formed of infrared absorbing or "green" glass, is positioned within a conical reflector extending through an opening on the axis thereof so that the axis lies along a line intersecting the two focal points of the elliptical reflector. This arrangement focuses the infrared energy on the glass tube in the area in which the glass-to-metal seal is to be formed and possesses the additional advantage that a minimum of shadow forming structure is interposed between the infrared source and the glass to be heated. To prevent the occurrence of "blowouts" as the glass begins to soften and to flow inwardly toward the magnetic reed to form the seal, the conical reflector is moved toward the elliptical reflector so that the infrared energy is focused on or is capable of reaching only the top surface of the glass forming the seal. By shifting the reflector axially relative to the axis of elongation of the glass, the application of infrared energy to the area of the seal is controlled without disturbing the predetermined positions of the glass tube and the reed to be sealed therein.

Many other objects and advantages of the present invention will become apparent from considering the following detailed description in conjunction with the drawings in which:

FIG. 1 is a top plan view of an infrared heating assembly previously used;

FIG. 2 is a side elevational view of the heating assembly shown in FIG. 1;

FIG. 3 is a schematic elevational view in partial section illustrating an infrared heating assembly embodying the present invention and shown in the position occupied at the beginning of the heating operation;

FIG. 4 is a view similar to FIG. 3 illustrating the condition of the heating assembly at the end of the heating operation; and FIG. 5 is a top plan view taken along line 5—5 in FIG. 3.

Referring now more specifically to FIGS. 1 and 2 of the drawings, therein is illustrated a known arrangement for using infrared energy to form glass-to-metal seals in the process of manufacturing sealed magnetic reed switches. The reed switches are manufactured using magnetic reeds (not shown), and a tube 12 of glass having very high infrared energy absorption, such as "green" glass. The reeds are inserted in the open ends of the tubes 12, and the glass at the ends of the tube is softened or melted to flow into engagement with the inserted reeds to form a glass-to-metal seal. In the apparatus 10, a high intensity infrared energy source 14 is disposed at a first focal point of an elliptical infrared reflector 16 so that energy impinging on the reflector 16 is focused on a second focal point indicated at 18. A spheroidal back reflector 20 is spaced at the other side of the second focal point 18 from the elliptical reflector 16 to collect radiation passing beyond the focal point 18 and to return this energy to the vicinity of the focal point 18.

To insure the maximum transfer of energy from the infrared energy source 14 to the tube 12, the tube is disposed at the second focal point 18 with the axis of elongation of the tube 12 extending perpendicular to the axis of the reflector 16, i.e., a line connecting the two focal points of the reflector 16. By efficiently collecting and utilizing the infrared energy from the source 14, the time required to melt or soften the glass of the tube 12 disposed at the focal point 18 to the extent that it flows into engagement with the inserted magnetic reed (not shown) and thus froms the magnetic seal, is substantially reduced. Seals produced by the apparatus 10 require on the order of four seconds.

However, in attempting to carry out the automatic assembly and manufacture of reed switches using a heating apparatus of the general nature of the apparatus 10, it has been determined that it is difficult to achieve the full advantages of this system because of the number of somewhat critical dimensions that must be maintained for maximum energy transfer. As an example, it is necessary to control the distance A from the reflector 16 to the center line or axis of the glass tube 12, the distance B from the back reflector 20 to the center line of the glass tube 12, the distance C from the center line or axis of the reflector 16 to the end of the glass tube 12, the distance D from the axis or center line of the back reflector 20 to the end of the glass tube 12, the distance E from the center line of the reflector 16 to the axis of the tube 12 measured in a direction at right angles to the distance C, and the distance F from the center line of the back reflector 20 to the axis of the glass tube 12 measured in a direction perpendicular to the distance D. Further, it is necessary to control the separation G of the two parts 20A and 20B of the back reflector 20, which separation lies in the shadow area of the reflector to permit variations in the focal point of this reflector 20. If all of these seven dimensions are not carefully controlled, the maximum transfer of energy from the source 14 to the glass tube 12 is not obtained, and in addition, uneven heating of the end portion of the glass tube 12 occurs with the result that an objectionable nonsymmetrical seal between the glass tube 12 and the magnetic reed occurs.

FIGS. 3-5 of the drawings illustrate an infrared heating apparatus which is indicated generally as 30 and which embodies the present invention. The apparatus 30 is capable of producing glass-to-metal seals in reed switches in a shorter period of time and is better adapted for use in automatic assembling and manufacturing equipment in requiring the control of a substantially smaller number of critical dimensions than the assembly previously used. The apparatus 30 is also capable of reducing or avoiding the oxidation of the reeds and the occurrence of "blowouts" during fabrication of the switches and of improving seal symmetry.

The apparatus 30 is used to make sealed magnetic reed switches consisting of a pair of magnetic reeds 32 formed of a suitable material such as nickel-iron alloys which are sealed in the open opposite ends of a glass tube 34. The glass forming the tube, which is sometimes called "green" glass, contains a small amount of iron oxide to provide a very high energy absorption in the infrared region of around one to four microns wavelength. This glass has a working point of around 1780° F., a softening point of 1160° F., and an annealing point of 810° F. By subjecting the glass of the tube 34 to infrared energy, the glass can be softened or melted to form a seal with the magnetic reeds 32.

The apparatus 30 for making the sealed switches includes an elliptical reflector 36 at one focal point of which an infrared energy source 38 is disposed. The infrared source 38 can comprise a 650-1000 watt quartz iodine lamp produced by Argus Engineering Company of Hopewell, N.J. The apparatus also includes a back reflector 40 having a reflecting surface 42 which is conical or of conic section and which in one embodiment of the present invention comprises a reflecting surface of an 82° right circular cone. The axis of the reflecting surface 42 is aligned or coincident with the axis of the elliptical reflector 36 or lies on the line connecting the two focal points of the elliptical reflector 36.

When a glass-to-metal seal is to be made, a magnetic reed 32 is inserted into one open end of the glass tube 34 and held in position by a holding means 44 of any suitable construction. The glass tube 34 is also held in any suitable known holding or chuck means in such a position that the axis of elongation of the tube 34 generally coincides with the axis of the reflector 36 with the end of the tube 34 in which the seal is to be made disposed within the conical reflector 42. The end of the tube 34 that is to be softened to form the seal is disposed at the second focal point of the reflector 36.

When the infrared energy source 38 is energized, the energy emitted therefrom is directly transmitted to and focused by the reflector 36 and the conical reflecting surface 42 of the back reflector 40 on the open end of the tube 34 to be absorbed by the glass at the upper end of the tube 34 so that it becomes softened and flows inwardly toward the reduced diameter portion of the reed 32 to form a seal therewith. Since the only structure interposed between the reflector 36 and the portion of the glass tube 34 to be heated is the upper end of the reed 34 and the very small transverse dimension of the holding means 44, the shadow area is very small, and the energy transmission from the source 38 to the upper end of the glass tube 34 is quite efficient. Further, the conical reflecting surface 42 serves to evenly distribute the heat around the upper end of the glass tube 34 to aid in the production of a symmetrical seal. In addition, the transmission of infrared energy to areas remote from the area in which the seal is to be formed is prevented. This avoids the heating of the portion of the reed 32 located within the tube 34 and thus avoids its oxidation.

To provide means for further insuring the symmetry of the seal and to avoid "blowouts," means are provided in the apparatus 30 for shifting the position of the reflector 40. More specifically, this arrangement, which can be of any suitable construction, is illustrated as comprising a generally Y-shaped lever 46 pivoted at a point 48 and having two bifurcations or arms 46A and 46B with rounded portions which bear against a lower surface of the reflector 40. The other end of the lever 46 is connected to a motive power source or solenoid 50. The lever 46 normally occupies the position illustrated in FIG. 3 at the initiation of the infrared heating operation.

When the glass at the top of the tube 34 starts to soften and flow toward the magnetic reed 32, the power source or solenoid 50 is energized to pivot the lever 46 in a counterclockwise direction about the pivot point 48. This shifts the reflector 40 upwardly from the position shown in FIG. 3 to the position illustrated in FIG. 4. By moving the conical reflecting surface 42 toward the energy source 38, the upper end of the glass tube 34 in which the seal is to be formed remains at the second focal point of the reflector 36, but the energy reflected off the conical surface 42 is concentrated at the upper surface of the seal in formation, as indicated at 52 in FIG. 4, so that the greatest quantity of heat is concentrated at the point at which the glass of the tube 34 must be rendered most molten to flow into contact with the reed 32 to form the seal. Further, the heating of the glass tube 34 in the area immediately below the seal is somewhat reduced. If the seal being formed in the switch is the second seal so that the volume within the glass tube 34 is sealed from communication with the atmosphere, the concentration of heat at the end of the seal at the point 52 and the removal of heat from the lower portion of the glass tube 34 prevents excessive heating of the sealed atmosphere within the switch, and thus tends to reduce "blowouts." In addition, by moving the concentration of heat upwardly to the general area indicated by 52, the symmetry of the finished seal is improved and heating of the part of the reed 32 within the tube 34 is reduced. The solenoid or drive means 50 can be released to restore the reflector 40 to the position illustrated in FIG. 3 at the conclusion of the formation of the seal and condition the apparatus 30 for forming the seal on the next switch. Seals produced by the apparatus 30 require on the order of two seconds using an energy source 38 of the same power as the source 14.

The apparatus 30 is well suited for automatic assembling operations because only three dimensions must be accurately controlled to insure efficient and accurate heat application and distribution. More specifically, the center line or axis of the elongated glass tube 34 relative to the center line or axis of the elliptical reflector 36 must be controlled in two mutually perpendicular directions, and the spacing of the reflector 36 and the conical reflector 40 must be controlled. Thus, only these three dimensions must be controlled to insure accurate and efficient heat distribution and concentration. A fourth dimension, namely the position of the end of the glass tube 34 along the axis of the conical reflecting surface 42, can be controlled in the manner described above to improve the symmetry of the seal and prevent "blowouts."

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. An apparatus for sealing a magnetic element in one end of an elongated glass tube capable of absorbing infrared energy comprising:
   an elliptical reflector having a first focal point,
   an infrared energy source disposed at said first focal point so that the energy from said source passes through a second focal point spaced from the first focal point,
   a conical reflector having its axis passing through the first and second focal points, said conical reflector having an opening therein lying on its axis and being so disposed relative to the elliptical reflector that the second focal point of the elliptical reflector is disposed within the conical reflector spaced from its apex,
   means for mounting a glass tube in said opening with a given end of the tube in which the magnetic element is to be sealed located within the cone of the reflector at said second focal point and with the tube extending generally along the axis of the cone,
   and means for mounting a magnetic element within said given end of the tube and extending toward said elliptical reflector.

2. The apparatus set forth in claim 1 including adjusting means for adjusting the relative positions of the conical reflector and tube by selectively producing oppositely directed relative movement therebetween along said axis.

3. The apparatus set forth in claim 1 including adjusting means coupled to the conical reflector for moving the conical reflector toward and away from the elliptical reflector along said axis.

4. An apparatus for forming glass-to-metal seals between an infrared absorbing glass tube and an inserted metal element, the glass tube and metal element being disposed in a given position, which apparatus comprises:
   an infrared energy source,
   a first reflector including an elliptical reflecting surface with a first axis for directing infrared energy on the glass tube at the point at which the glass-to-metal seal is to be formed,
   a second reflector disposed adjacent the glass tube and metal element for directing infrared energy received from the source and the first reflector to the point on the tube at which the seal is to be formed, said second reflector including a conical reflecting surface whose axis is generally aligned with the first axis,
   and adjusting means for moving the second reflector and glass relative to each other along said axes during the energization of the source for moving the point on the glass tube at which the reflected energy from the second reflector is directed.

5. The apparatus set forth in claim 4 in which the conical reflector includes an opening on its axis for receiving the glass tube.

6. The apparatus set forth in claim 5 in which the adjusting means moves the conical reflector toward the elliptical reflector along said axes.

References Cited

UNITED STATES PATENTS

| | | | |
|---|---|---|---|
| 838,950 | 12/1906 | Coger et al. | 250—88 |
| 1,554,812 | 9/1925 | Girard | 219—349 |
| 1,881,525 | 10/1932 | Halpern | 240—41.1 |
| 1,932,703 | 10/1933 | Mancuso | 219—347 X |
| 1,963,883 | 6/1934 | Brinkmier. | |
| 2,364,730 | 12/1944 | Leskin. | |
| 2,785,623 | 3/1957 | Graham | 219—385 X |
| 3,152,245 | 10/1964 | Litman | 219—433 |

FOREIGN PATENTS

| | | |
|---|---|---|
| 85,925 | 7/1958 | Denmark. |
| 502,262 | 7/1930 | Germany. |
| 375,373 | 6/1932 | Great Britain. |

ANTHONY BARTIS, Primary Examiner

U.S. Cl. X.R.

219—85, 348; 240—41.35; 250—88; 350—288